Jan. 20, 1953 P. A. CLOWER 2,626,194
RETRACTILE TRAY FOR AUTOMOBILE INSTRUMENT PANELS
Filed Nov. 3, 1950
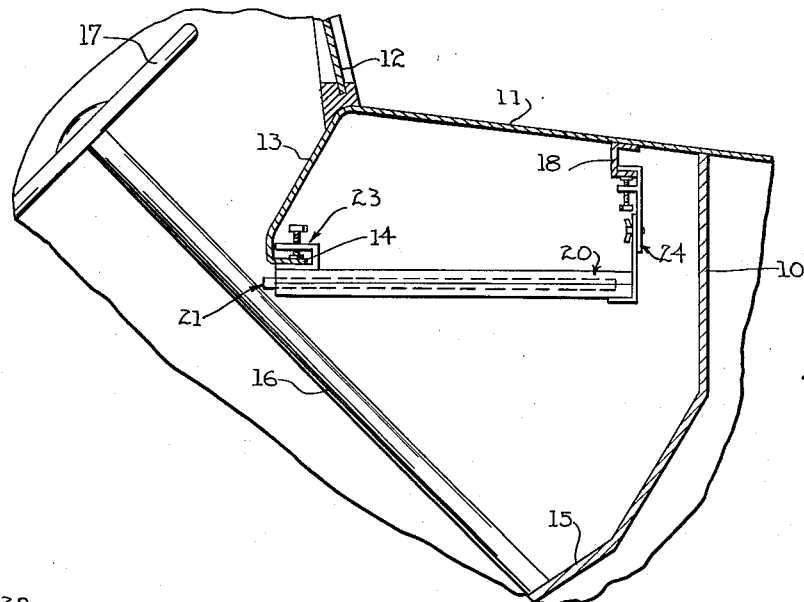
FIG. 1
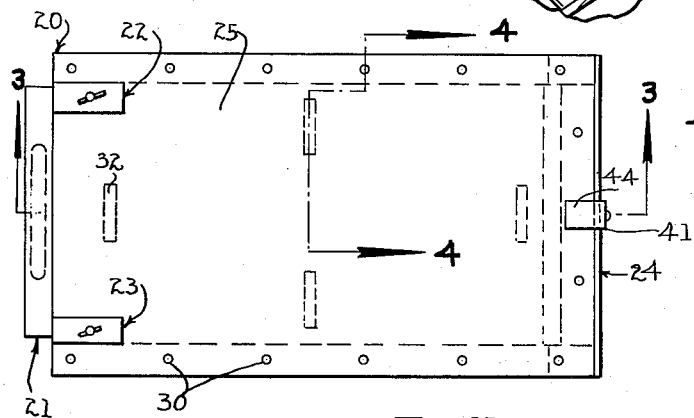
FIG. 2
FIG. 3
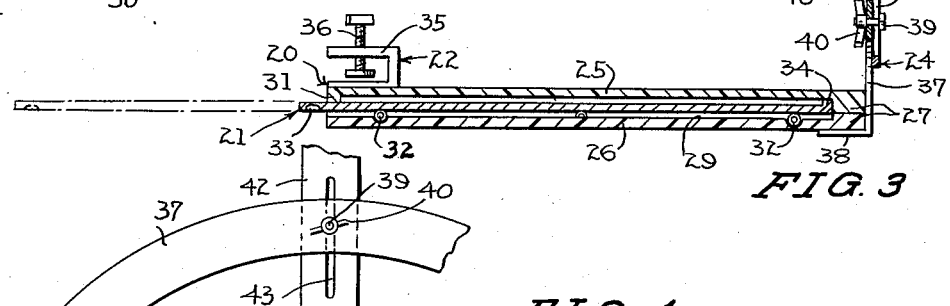
FIG. 4
INVENTOR.
PATRICK A. CLOWER
BY
McMorrow, Berman + Davidson
ATTORNEYS Patented Jan. 20, 1953

2,626,194

UNITED STATES PATENT OFFICE 2,626,194

RETRACTILE TRAY FOR AUTOMOBILE INSTRUMENT PANELS

Patrick A. Clower, Alice, Tex.

Application November 3, 1950, Serial No. 193,994

2 Claims. (Cl. 311—21)

This invention relates to an improved retractile tray assembly for an automobile instrument panel.

The primary object of the invention is to provide a simple and more rugged device of this kind which can be more easily and quickly installed beneath automobile instrument panels of varying construction and proportions without the use of tools, and which has a more easily operable and more adequately supported retractile tray or table element.

Other objects and advantages will become apparent from a consideration of the following description and the appended claims in conjunction with the accompanying drawing wherein:

Figure 1 is a fragmentary cross sectional view through an automobile body showing in side elevation a tray assembly illustrative of the invention operatively mounted in the body;

Figure 2 is a top plan view of a tray assembly illustrative of the invention;

Figure 3 is a longitudinal cross sectional view on the line 3—3 of Figure 2; and Figure 4 is a fragmentary cross sectional view on an enlarged scale on the line 4—4 of Figure 2.

With further reference to the drawing, the fragmentary portion of a conventional automobile illustrated includes the body front wall or fire wall 10, a cowl 11 overlying the upper edge of the fire wall, a windshield 12 extending upwardly from the rear edge of the cowl, an instrument panel 13 extending downwardly and rearwardly from the rear edge of the cowl and having at its lower edge a forwardly extending flange 14, a floor board 15 at the lower edge of the fire wall 10, a steering column 16 inclined upwardly and rearwardly from the floor board past the lower edge of the instrument panel 13 and a steering wheel 17 on the upper end of the steering column. A brace 18 of channel shaped cross section underlies the cowl 11 adjacent to and substantially parallel to the upper edge of the fire wall 10 to reinforce the cowl structure.

The illustrated tray of the present invention comprises a flat rectangular hollow housing 20 having a rectangular cavity or interior space therein opening through one end of the housing, a rectangular tray plate 21 of substantially the same width and shape as the interior of the housing and slidably secured in the housing and projecting from the open end of the housing, rear brackets 22 and 23 secured to the housing at the open end thereof and projecting from the same side of the housing for securing the latter to the bottom flange 14 of the instrument panel, and a forward bracket 24 secured to the housing at its rear or closed end and projecting from the same side of the housing as the brackets 22 and 23 for securing the closed end of the housing to the cowl brace 18.

The housing 20 comprises two superimposed and registered rectangular plates 25 and 26 having marginal flanges 27 and 28, respectively, on three edges thereof on the facing sides of the plates which abut and hold the plates apart and define the rectangular concavity 29 in the housing. The plates 25 and 26 are secured together by suitable means, such as screws 30 extending through apertures provided in the flanged areas of the housing plates. The upper plate 25 is provided at the open end of the housing with a downwardly extending flange 31, the purpose of which will presently appear.

The lower plate 26 of the housing is provided in its upper surface with longitudinally spaced transversely extending recesses accommodating rollers 32.

The housing may be conveniently formed of a suitable moldable material, such as synthetic resin plastic, and is substantially moisture proof and dust proof in construction.

The tray plate 21 is plane and rectangular in form and is of suitably stiff sheet material, such as compressed fibre, and has a size and shape substantially the same as the size and shape of the cavity 29 of the housing 20. The tray plate, however, has a thickness less than the thickness of the cavity 29, so that the tray can slide freely in the cavity and ride on the rollers 32 which project slightly above the upper surface of the bottom plate 26 of the housing, and has a length slightly greater than that of the cavity 29 so that a rear end portion of the tray projects at all times beyond the open end of the housing.

The end portion of the tray plate 21 projecting from the open end of the housing 20 is provided in its under surface with a transversely extending finger groove 33 to facilitate sliding the tray inwardly and outwardly of the housing 20.

A transversely extending stop flange 34 is provided on the upper surface of the tray plate 21 at its forward end for engaging the flange 31 on the plate 25 at the open end of the housing to limit outward movement of the tray relative to the housing.

With this arrangement, the tray can be pulled out of the housing for its major extent, but a portion of the tray sufficient to firmly support the tray in cantilever relationship to the housing will remain at all times in the cavity 29 of the housing.

Each of the rear brackets 22 and 23, as illustrated in Figure 3, comprises a reclining U-shaped clip 35 of rectangular shape having a lower leg disposed upon and secured to the top plate 25 of the housing 20, and an upper leg provided with a tapped hole receiving a thumb screw 36. The two brackets 22 and 23 are disposed one at each corner of the housing at the rearward end thereof with their open ends facing rearwardly and receiving the bottom flange 14 of the instrument panel 13 therein, with the thumb screws 36 tightened onto the upper surface of the flange 14.

The front bracket 24 comprises an upwardly bowed member 27 extending transversely of the forward or closed end of the housing 20 and having on its ends rearwardly directed portions 38 underlying the bottom plate 26 of the housing at the corners of the housing. The member 37 rises above the top plate 25 of the housing and is provided at its midpoint with an aperture receiving a bolt 39 provided with a wing nut 40, the bolt 39 passing through a vertical slot 43 provided in the lower part 42 of a vertically elongated flat bar 41. At its upper end the bar 41 is provided with a reclining U-shaped clip having spaced upper and lower parallel legs 44 and 45, the lower leg 45 being provided with a tapped hole receiving a thumb screw 46. The clip legs 44 and 45 receive therebetween the bottom flange of the U-shaped brace 18. The thumb screw 46 is turned up against the brace flange so as to clamp the brace flange between the screw and the upper leg 44 of the clip so as to firmly secure the front or closed end of the housing to the cowl brace 18.

The front bracket 24 is arranged to be adjusted to position the housing 20 substantially horizontally so that the tray plate 21, when pulled out of the housing, will provide a substantially horizontal supporting surface for food, beverages, and other articles or for use as a table for writing, reading maps, and for other purposes.

The invention may be embodied in other specific forms without departing from the spirit or essential characteristics thereof. The disclosed embodiment is, therefore, to be considered in all respects as illustrative and not restrictive, the scope of the invention being defined by the appended claims rather than by the foregoing description, and all changes which come within the meaning and range of equivalency of the claims are, therefore, intended to be embraced therein.

What is claimed is:

1. In a retractile tray for an automobile instrument panel, a flat rectangular hollow housing having a rectangular cavity therein opening through one end of the housing, a first transverse flange at the open end of said concavity, a tray plate slidably engaged in said concavity and having an end extending through the opening in the said one end of the housing, a second transverse flange on said end of the tray plate and projecting from a side of the tray plate, said second flange being arranged to engage said first flange to limit withdrawal of the tray plate through the open end of the housing, roller means on a wall of said housing and supportably engaging the side of said tray plate remote from said second flange.

2. In a retractile tray for mounting on an automobile instrument panel and cowl, a housing comprising upper and lower rectangular plates, said plates being superimposed and registered, said plates having flanges on their facing sides, said flanges being positioned along the side edges and one end of the plates and in abutting relation and defining a rectangular cavity between the plate opening through the other end of the housing, means securing the plates together, rollers on said lower plate and extending thereacross, said rollers projecting above the upper surface of the lower plate, a plane tray plate extending in said cavity and resting upon said rollers, a first stop flange depending from said upper plate at the opening end of the housing, and a second stop flange rising from the end of the tray plate remote from the open end of the housing for engaging said first stop flange so as to limit withdrawal of the tray plate through the open end of the housing.

PATRICK A. CLOWER.

REFERENCES CITED

The following references are of record in the file of this patent:

UNITED STATES PATENTS

| Number | Name | Date |
|---|---|---|
| 7,789 | Shenberger | Nov. 19, 1850 |
| 884,525 | Ripson et al. | Apr. 14, 1908 |
| 1,129,831 | Schaffert | Feb. 23, 1915 |
| 1,698,615 | Wilkins | Jan. 8, 1929 |
| 1,946,967 | Douglas | Feb. 13, 1934 |
| 2,080,261 | Funk | May 11, 1937 |
| 2,139,309 | Linden | Dec. 6, 1938 |
| 2,170,013 | Detwiler | Aug. 22, 1939 |
| 2,199,981 | Bell | May 7, 1940 |
| 2,205,974 | Kramer | June 25, 1940 |
| 2,270,948 | Howe | Jan. 27, 1942 |
| 2,435,151 | Morgan | Jan. 27, 1948 |
| 2,546,459 | Lee | Mar. 27, 1951 |
| 2,593,222 | Tracy | Apr. 15, 1952 |